US008244522B2

(12) United States Patent
Nakano et al.

(10) Patent No.: US 8,244,522 B2
(45) Date of Patent: Aug. 14, 2012

(54) LANGUAGE UNDERSTANDING DEVICE

(75) Inventors: Mikio Nakano, Tokyo (JP); Hiroshi Okuno, Kyoto (JP); Kazunori Komatani, Kyoto (JP); Yuichiro Fukubayashi, Yokohama (JP); Kotaro Funakoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 1015 days.

(21) Appl. No.: 12/123,757

(22) Filed: May 20, 2008

(65) Prior Publication Data
US 2008/0294437 A1    Nov. 27, 2008

Related U.S. Application Data

(60) Provisional application No. 60/939,422, filed on May 22, 2007.

(51) Int. Cl.
*G06F 17/27* (2006.01)
*G06F 17/20* (2006.01)
*G10L 15/00* (2006.01)

(52) U.S. Cl. ............... 704/9; 704/1; 704/231; 704/240

(58) Field of Classification Search ........... 704/1–10, 704/251, 257
See application file for complete search history.

(56) References Cited

U.S. PATENT DOCUMENTS

| | | | | |
|---|---|---|---|---|
| 6,009,382 A * | 12/1999 | Martino et al. | ............... | 704/1 |
| 6,278,968 B1 * | 8/2001 | Franz et al. | ............... | 704/3 |
| 6,377,949 B1 * | 4/2002 | Gilmour | ............... | 1/1 |
| 6,859,778 B1 * | 2/2005 | Bakis et al. | ............... | 704/277 |
| 7,299,180 B2 * | 11/2007 | Wang et al. | ............... | 704/257 |
| 7,451,089 B1 * | 11/2008 | Gupta et al. | ............... | 704/270.1 |
| 2004/0111264 A1 * | 6/2004 | Wang et al. | ............... | 704/257 |
| 2007/0271088 A1 * | 11/2007 | Waibel et al. | ............... | 704/9 |
| 2009/0157405 A1 * | 6/2009 | Stewart et al. | ............... | 704/257 |

(Continued)

FOREIGN PATENT DOCUMENTS

JP    2001-188783    7/2001

(Continued)

OTHER PUBLICATIONS

Stephanie Seneff, "TINA: A natural language system for spoken language applications.", Computational linguistics, vol. 18, No. 1, pp. 61-86, 1992.

(Continued)

*Primary Examiner* — Richemond Dorvil
*Assistant Examiner* — Michael Ortiz Sanchez
(74) *Attorney, Agent, or Firm* — Rankin, Hill & Clark LLP

(57) ABSTRACT

A language understanding device includes: a language understanding model storing unit configured to store word transition data including pre-transition states, input words, predefined outputs corresponding to the input words, word weight information, and post-transition states, and concept weighting data including concepts obtained from language understanding results for at least one word, and concept weight information corresponding to the concepts; a finite state transducer processing unit configured to output understanding result candidates including the predefined outputs, to accumulate word weights so as to obtain a cumulative word weight, and to sequentially perform state transition operations; a concept weighting processing unit configured to accumulate concept weights so as to obtain a cumulative concept weight; and an understanding result determination unit configured to determine an understanding result from the understanding result candidates by referring to the cumulative word weight and the cumulative concept weight.

4 Claims, 5 Drawing Sheets

U.S. PATENT DOCUMENTS

2010/0191530 A1* 7/2010 Nakano et al. ............... 704/244

FOREIGN PATENT DOCUMENTS

| | | |
|---|---|---|
| JP | 2004-251998 | 9/2004 |
| JP | 2005-257917 | 9/2005 |
| JP | 2006-208905 | 8/2006 |

OTHER PUBLICATIONS

Katsuhito Sudoh and Hajime Tsukada, "Tightly integrated spoken language understanding using work-to-concept translation.", in Proc. Eurospeech, pp. 429-432, 2005.

Alexandors Potamianos and Hong-Kwang J. Kuo, "Statistical recursive finite state machine parsing for speech understanding.", In Proc. ICSLP, pp. 510-513, 2000.

Chai Wutiwiwatchai and Sadaoki Furui, "Hybrid statistical and structural semantic modeling for Thai multi-stage spoken language understanding.", In Proc. HLT-NAACL Workshop on Spoken Language Understanding for Conversational Systems and Higher Level Linguistic Information for Speech Processing, pp. 2-9, 2004.

Akinobu Lee, Kiyohiro Shikano, and Tatsuya Kawahara, "Real-time word confidence scoring using local posterior probalities on tree trellis search.", In Proc. ICASSP, vol. 1, pp. 793-796, 2004.

Bernd Souvignier et al.: "The Thoughtful Elephant: Strategies for Spoken Dialog Systems" IEEE Transactions on Speech and Audio Processing, Jan. 1, 2000, pp. 51-62, XP011053990 New York, NY, US, ISSN: 1063-6676.

Chai Wutiwiwatchai et al.: "Confidence scoring for ANN-based spoken language understanding" Automatic Speech Recognition and Understanding, 2003. ASRU '03. 2003 IEEE Workshop on St. Thomas, VI, USA Nov. 30-Dec. 3, 2003, Piscataway, NJ, USA, IEEE, Nov. 30, 2003, pp. 566-571, XP010713221, ISBN: 978-0-7803-7980-0.

Aust H. et al.: "Database query generation from spoken sentences" Interactive Voice Technology for Telecommunications Applications, 1994, Second IEEE Workshop on Kyoto, Japan Sep. 26-27, 1994, New York, NY, USA, IEEE, Sep. 26, 1994, pp. 141-144, XP010124350, ISBN: 978-0-7803-2074-1.

Eric I. Chang: "Improving Rejection With Semantic Slot-Based Confidence Scores" 6th European Conference on Speech Communication and Technology, Eurospeech '99, vol. 1, Jan. 1, 1900, pp. 271-274 XP007000967. Budapest, Hungary.

Sudoh K. et al.: "Post-dialogue confidence scoring for unsupervised statistical language model training", Speech Communication, Elsevier Science Publishers, vol. 45, No. 4, Apr. 1, 2005, pp. 387-400, XP004823825 Amsterdam, NL, ISSN: 0167-6393.

Kellner A.: "Initial language models for spoken dialogue systems", Acoustics, Speech and Signal Processing, 1998. Proceedings of the 1998 IEEE International Conference on, vol. 1, May 12, 1998, pp. 185-188, XP010279150, Seattle, WA, USA, ISBN: 978-0-7803-4428-0.

Zue V. et al.: "Integration of speech recognition and natural language processing in the MIT Voyager system", Speech Processing 1. Toronto, May 14-17, 1991; [International Conference on Acoustics, Speech & Signal Processing. ICASSP], New York, IEEE, US vol. 1 conf. 16, Apr. 14, 1991, pp. 713-716, XP010043075, Toronto, Canada, ISBN: 978-0-7803-0003-3.

* cited by examiner

LANGUAGE UNDERSTANDING DEVICE

CROSS REFERENCE TO RELATED APPLICATIONS

This application claims benefit from U.S. Provisional application Ser. No. 60/939,422, filed May 22, 2007, the contents of which are incorporated herein by reference.

BACKGROUND OF THE INVENTION

1. Field of the Invention

The present invention relates to a natural language processing, in particular, relates to a language understanding device which carries out language understanding based on speech recognition results or the like.

2. Description of Related Art

As a method for language understanding based on speech recognition, a non-patent document 1 (Stephanie Seneff, "TINA: A natural language system for spoken language applications.", Computational Linguistics, Vol. 18, No. 1, pp. 61-86, 1992) discloses a method in which utterances of a user is classified in accordance with keyword spotting or heuristic rules. Moreover, non-patent document 2 (Katsuhito Sudoh and Hajime Tsukada, "Tightly integrated spoken language understanding using word-to-concept translation.", In Proc. EUROSPEECH, pp. 429-432, 2005) discloses a method in which occurrence probabilities are learned by using a corpus-based method. Furthermore, a non-patent document 3 (Alexandors Potamianos and Hong-Kwang J. Kuo., "Statistical recursive finite state machine parsing for speech understanding.", In Proc. ICSLP, pp. 510-513, 2000) and a non-patent document 4 (Chai Wutiwiwatchai and Sadaoki Furui, "Hybrid statistical and structural semantic modeling for That multi-stage spoken language understanding.", In Proc. HLT-NAACL Workshop on Spoken Language Understanding for Conversational Systems and Higher Level Linguistic Information for Speech Processing, pp. 2-9, 2004) disclose a method in which a Weighted Finite State Transducer (WFST) is used.

Language understanding (LU) in spoken dialogue systems needs to be robust against automatic speech recognition (ASR) errors. Moreover, it is preferable that such a language understanding device use a small amount of training data for its construction because it takes a lot of efforts and time to collect data for a new domain, and less data for a new domain make it easier to construct a language understanding device of a new spoken dialogue system. Several methods of implementing a language understanding device in spoken dialogue systems have been proposed. Using a grammar-based speech recognizer is one of the simplest methods. Although the ASR result can be transformed into concepts without difficulty, complicated grammars are required to understand utterances of various expressions, and it costs expensive to the system developer.

Classifying users' utterances using keyword spotting or heuristic rules is another method (non-patent document 1). In this method, utterances can be transformed into concepts without large modification of the rules. However, it also takes a lot of time and efforts to the system developer as in the case of the grammar-based speech recognition methods, because many complicated rules must be prepared manually.

To cope with these problems, a method in which occurrence probabilities are learned by using a corpus-based method (non-patent document 2) and Weighted Finite State Transducer (WFST)-based methods (non-patent documents 3 and 4) have been proposed. These methods, however, require a lot of training data to implement the device, and they are not suitable for constructing a language understanding device for a new domain. In addition, the trained results depend on the domain of the used corpus. Furthermore, because weights are fixed, such methods cannot deal with changes in the state of speech and users.

SUMMARY OF THE INVENTION

The present invention was made in view of the above problems, and an object thereof is to provide a language understanding device which can relatively easily be constructed without requiring a lot of training data and complicated rules, and also has robustness.

In order to achieve the above object, an aspect of the present invention provides a language understanding device (1, 201) including: a language understanding model storing unit (10, 210) configured to store, as a language understanding model, word transition data including pre-transition states, input words, predefined outputs corresponding to the input words, word weight information, and post-transition states, and concept weighting data including concepts obtained from language understanding results for at least one word, and concept weight information corresponding to the concepts; a finite state transducer processing unit (20, 220) configured to output understanding result candidates including the predefined outputs based on words included in a word sequence being input and present states, and in accordance with the word transition data read out from the language understanding model storing unit, to accumulate word weights so as to obtain a cumulative word weight, and to sequentially perform state transition operations by which transitions to the post-transition states are carried out; a concept weighting processing unit (30, 230) configured to accumulate concept weights, which correspond to the concepts included in the understanding result candidates output from the finite state transducer processing unit, in accordance with the concept weighting data read out from the language understanding model storing unit so as to obtain a cumulative concept weight; and an understanding result determination unit (40, 240) configured to determine an understanding result from the understanding result candidates by referring to the cumulative word weight and the cumulative concept weight (a first aspect).

According to the above construction, the finite state transducer processing unit outputs understanding result candidates based on the word transition data while performing state transition operations in accordance with the input word sequence, and accumulates the word weights corresponding to the understanding result candidates. When the state transitions based on all of the words included in the input word sequence are completed, understanding result candidates and a cumulative word weight are obtained. The concept weighting processing unit accumulates, in accordance with the concept weighting data, the concept weights corresponding to the concepts included in the understanding result candidates. When the processes for all of the concepts included in the understanding result candidates are completed, a cumulative concept weight is obtained. When plural understanding result candidates are output, a cumulative word weight and a cumulative concept weight are obtained for each of the understanding result candidates. The understanding result determination unit carries out predetermined calculations based on the cumulative word weight and the cumulative concept weight, and determines the best candidate as an understanding result. Thus, the best understanding result can be obtained based on the input word sequence.

In other words, by performing weighing operations with respect to the WFST at two levels including an ASR result level (a level of word by word) and a concept level (a level of concept by concept) which is the results of language understanding, the language understanding accuracy can be relatively easily improved without preparing a lot of training data.

In the above language understanding device, the language understanding model storing unit (10, 210) may be further configured to store, as the language understanding model, filler transition data including pre-transition states, fillers matching an arbitrary word, filler weight information, and post-transition states, the finite state transducer processing unit (20, 220) may be further configured to accumulate filler weights in accordance with the filler transition data read out from the language understanding model storing unit so as to obtain a cumulative filler weight, and to perform the state transition operations by which transition to the post-transition states are carried out, and the understanding result determination unit (40, 240) may be further configured to determine the understanding result by also referring to the cumulative filler weight (a second aspect).

According to the above construction, fillers are matched with arbitrary words (including a null word) included in the word sequence taken into by the finite state transducer processing unit, and the finite state transducer processing unit performs the state transition operations based on the matching. In addition, filler weights are accumulated during the state transitions. When the state transitions for all of the words included in the input word sequence are completed, understanding result candidates and accumulated filler weights are obtained. The understanding result determination unit determines the understanding result based on filler weights in additions to the word weights and the concept weights.

A robust language understanding can be performed by making the fillers match words (e.g., "well" or "uhm") in redundant utterances.

It should be noted that when the word weights or the concept weights are positive values, the filler weights is preferably negative values. By this configuration, the language understanding accuracy can be improved because understanding result that is well matched with the filler is hardly selected.

In the above language understanding device, the word sequence being input may be obtained by a speech recognition process, the language understanding model storing unit (40, 240) may be further configured to store the word weight information and the concept weight information which are determined depending on speech recognition accuracy (word accuracy) during the speech recognition process, and the understanding result determination unit may be further configured to determine the understanding result by referring to the cumulative word weight obtained based on the word weight information which depends on the speech recognition accuracy (word accuracy) and the cumulative concept weight obtained based on the concept weight information which depends on the speech recognition accuracy (a third aspect).

It should be noted that, in the case of the language understanding device having the constitutions according to the second and third aspects, the understanding result determination unit determines the understanding result based on the filler weights as well.

According to the above construction, it is possible to use the best type of weight depending on the ASR accuracy. Importance may be applied to either the word weight or the concept weight (or the filler weight) depending on the ASR accuracy. It should be noted that a language understanding model that outputs the best result depending on the ASR accuracy can be constructed by performing training beforehand.

As a result, the language understanding accuracy can be further improved.

In the above language understanding device, the word sequence being input may include N word-sequences, where N is a natural number equal to or greater than 2, the finite state transducer processing unit (220) may be further configured to output the understanding result candidates for each of the N word-sequences by performing the state transition operations for each of the N word-sequences, and the understanding result determination unit (240) may be further configured to determine the understanding result from all of the understanding result candidates corresponding to the N word-sequences (a fourth aspect).

According to the above construction, an input sequence, whose reliability is the second or lower (down to N-th level) during the ASR process which is the proceeding stage of the language understanding process, can be deemed to be the object of language understanding. The best solution in terms of both of the ASR and the language understanding can be output as the language understanding result for the N kinds of word sequences.

As a result, the language understanding accuracy can be further improved.

According to the present invention, a language understanding device can be provided, which can relatively easily be constructed without requiring a lot of training data and complicated rules, and also has robustness. In addition, according to the above measures, the language understanding accuracy can be further improved.

DETAILED DESCRIPTION OF THE INVENTION

Hereinbelow, embodiments of the present invention will be explained with reference to the appended drawings.

First Embodiment

Figure 1:
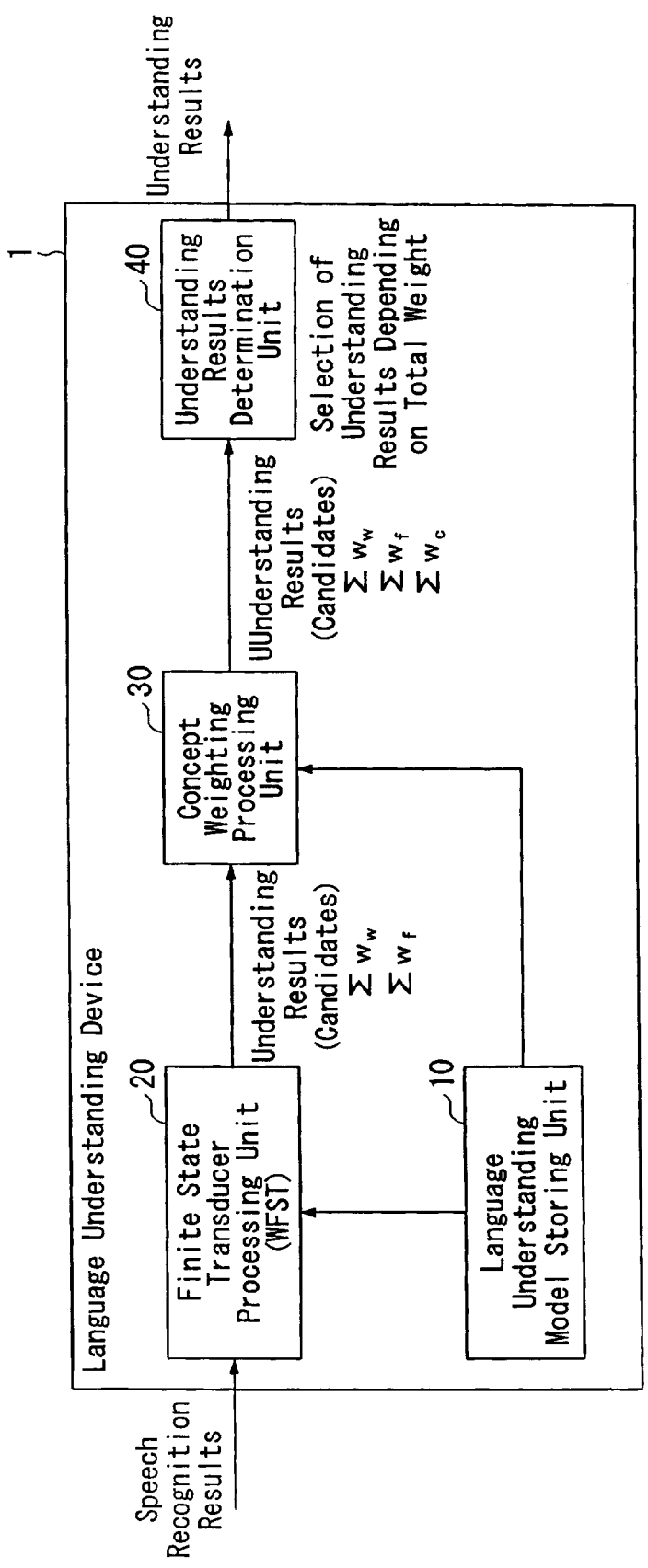
FIG. 1 is a block diagram showing the functional constitution of a language understanding device according to a first embodiment of the present invention.

FIG. 1 is a block diagram showing the functional constitution of a language understanding device 1 according to a first embodiment of the present invention. As shown in FIG. 1, the language understanding device 1 includes a language understanding model storing unit 10, a finite state transducer processing unit 20, a concept weighting processing unit 30, and an understanding result determination unit 40.

Figure 2:
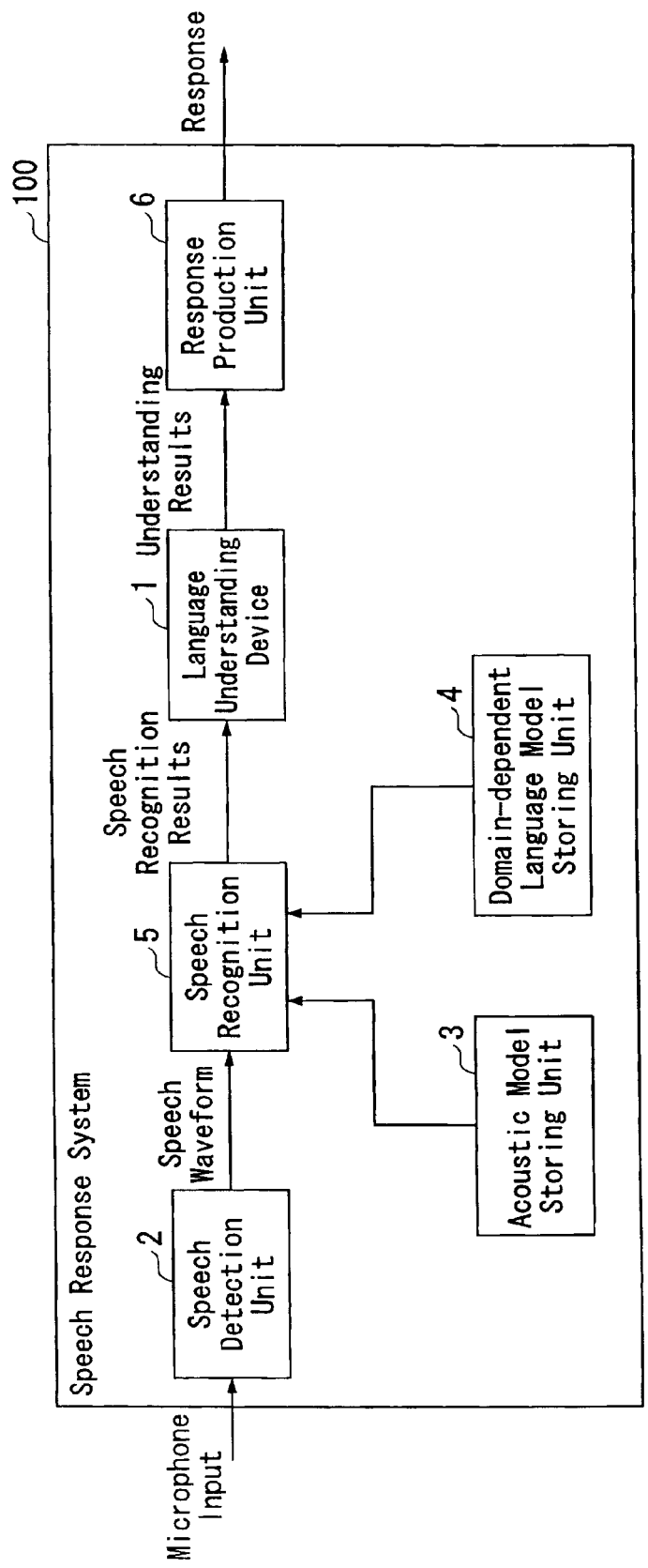
FIG. 2 is a block diagram showing the functional constitution of a speech response system according to the first embodiment.

FIG. 2 is a block diagram showing the functional constitution of a speech response system 100 according to the first embodiment. As shown in FIG. 2, the speech response system 100 includes, in addition to the language understanding device 1, a speech detection unit 2, an acoustic model storing unit 3, a domain-dependent language model storing unit 4, a speech recognition unit 5, and a response production unit 6.

Hereinbelow, technologies used in the language understanding device 1 and the speech response system 100 will be explained in detail first, and then the concrete operations of the above constructions will be explained.

<Overview>
Improving WFST-based Language Understanding Accuracy by Weighing for ASR Results and Concepts Weighted Finite State Transducer (WFST) have become common as a language understanding device in spoken dialogue systems. WFST promotes robust language understanding by assigning appropriate weights to a sequence of recognized words. However, it is difficult to make a language understanding device for a new spoken dialogue system using a WFST because a lot of training data is required to learn the weights. To create a robust language understanding device with less training data, we developed a model in which ASR results are classified into two classes, fillers and accepted words and concepts are formed by the latter. We then assign appropriate weights to these simplified results and concepts. The weights are designed by considering the number of phonemes and their ASR confidence. Experimental results showed that the language understanding accuracy was improved with less training data when the optimal setting from these parameters was selected based on the ASR accuracy (word accuracy) of the utterance and depending on users. This was shown by the fact that optimal settings were obtained successfully for each ASR accuracy.

We present a new WFST-based language understanding method. The input for the WFST is ASR results using statistical language model (SLM). Since the weighting for the WFST, which is assigned at two levels such as surface word and concept levels, is simpler than conventional learning. It require less data than conventional weighting schemes. Moreover, the features used in the weighting process is domain-independent, and thus can be applied to general spoken dialogue systems. The evaluation test showed improvement in language understanding accuracy by selecting appropriate parameters for the objective domain. As a result of further investigation, because the parameters change depending on the ASR accuracy, the language understanding accuracy can be improved by selecting an appropriate parameter setting according to ASR accuracy estimated in the objective domain. This result indicates that it will be possible to adaptively improve the language understanding accuracy by appropriately selecting the parameters depending on the ASR accuracy, users, or the like.

<1. Related Works and WFST-Based Approach>

Figure 3:
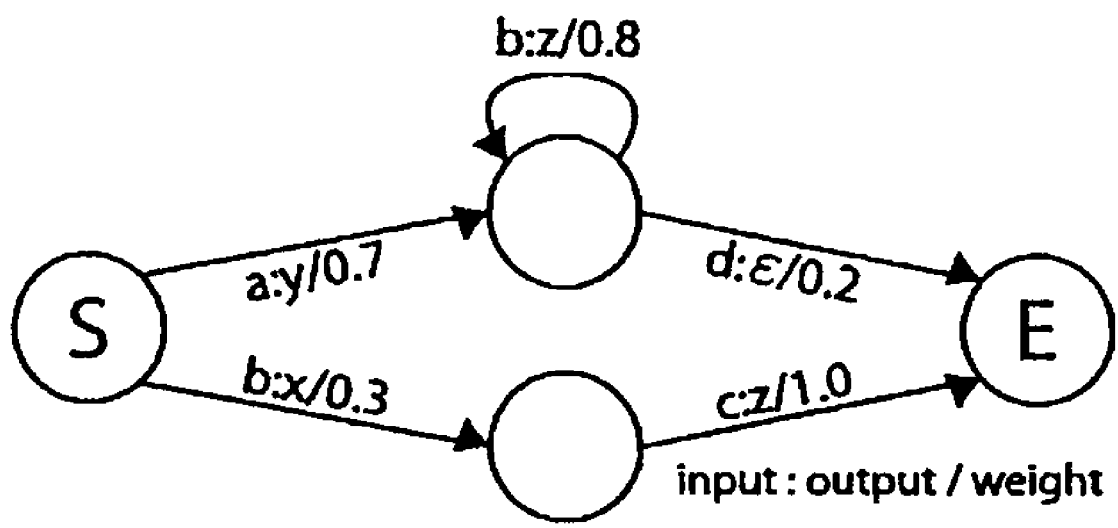
FIG. 3 is a schematic diagram showing an example of a WFST.

Annotated-corpus-based approaches for language understanding are proposed as a method of language understanding in spoken dialogue systems (non-patent document 2). A significant amount of annotated corpora are required to implement a language understanding device using this method. In these approaches, occurrence probabilities of pairs of ASR results and the corresponding concepts calculated from annotated corpora should be learnt. Therefore, a significant amount of annotated corpora are still required to implement the device. Another approach to a language understanding device is WFST-based methods (non-patent documents 3 and 4). Here, a FST is briefly explained. In general, an FST is an automaton which performs state transitions according to the input sequence and outputs a sequence corresponding to the input; therefore, an FST can be regarded as a converter. In a WFST, a weight can be assigned to a state transition, producing a cumulative weight with the resulting output. FIG. 3 shows an example of a WFST. In this figure, "a:y/0.7" means that if "a" is input to the WFST, it outputs "y" and adds 0.7 to the cumulative weight, and then a transition is performed. In this example, "yzz" is the output for the input "abbd", and the cumulative weight is 2.5.

Figure 4:
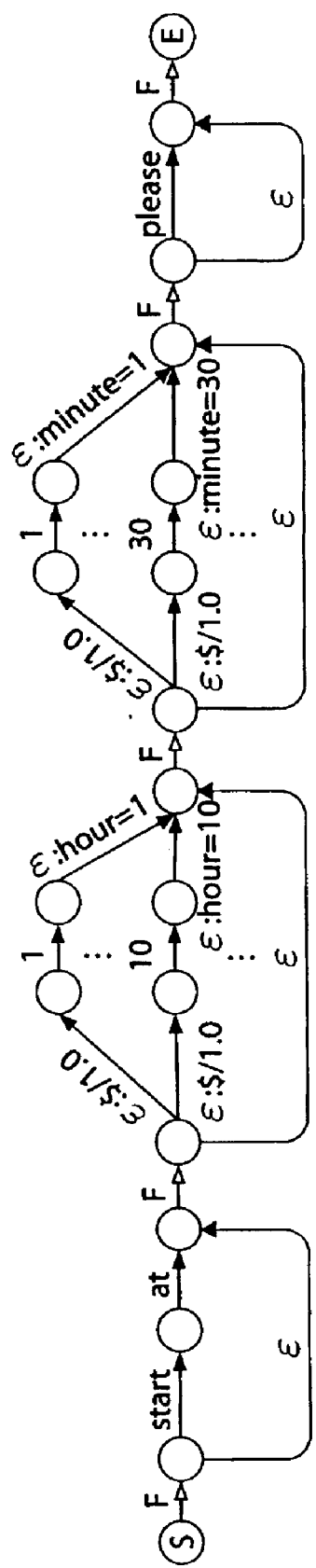
FIG. 4 is a schematic diagram showing an example of a WFST in which fillers (indicated by F) are introduced in the case of a language understanding device for a video recording reservation system.

In an FST-based language understanding device, the system inputs an ASR result to an FST, producing a language understanding result as the output. FIG. 4 shows an example of the FST for a video recording reservation domain. An input "ε" means that a transition with no input is permitted at the state transition. In this example, the language understanding device returns the output sequence "start at $10 hour=10 $30 minute=30 please" for the utterance "start at 10 30 please" ("$" is a dummy sign for no output). Finally, a concept [hour=10, minute=30] is obtained as a language understanding result. In this decoding, however, we cannot get the correct language understanding result for the input "well, start at 10:30 please" because the FST cannot perform a transition for the word "well". To avoid this problem, we implement a FILLER transition that accepts any word as an input. By inserting more than 0 filler transitions (indicated by "F" in FIG. 4) between the phrases appropriately, it is possible to obtain a correct language understanding even if the utterance has some redundant words without having effect of the filler.

Examples of utterance that contains FILLERs are shown in TABLE 1.

TABLE 1

| Input | LU result |
| --- | --- |
| well, start at 10 30 please | hour = 10, minute = 30 |
| OK, well, start at 10 30 please | hour = 10, minute = 30 |
| Start at uhm, 10 30 please | hour = 10, minute = 30 |
| start at 10 30 please, OK? | hour = 10, minute = 30 |
| start at 10 th-, 30 please | not accepted |

However, if filler transitions are introduced, multiple output sequences for one utterance due to filler transitions may be obtained because several transitions exist on the WFST for a single input sequence. In a WFST-based language understanding, the path of the highest cumulative weight w is selected as the language understanding result. In TABLE 2, the concept [hour=10, minute=30] is selected as the language understanding result, because its cumulative weight w is 2.0, which is the highest.

TABLE 2

| Output | | | | | LU result | w |
| --- | --- | --- | --- | --- | --- | --- |
| start | at | 10 | 30 | please | hour = 10, minute = 30 | 2.0 |
| F | F | 10 | 30 | please | hour = 10, minute = 30 | 2.0 |
| F | F | 10 | F | please | hour = 10 | 1.0 |
| F | F | F | 30 | F | minute = 30 | 1.0 |
| F | F | F | F | F | n/a | 0 |

(F = FILLER)

Conventional WFST-based approaches have to learn weights for each transition from a large amount of corpus (non-patent documents 3 and 4). Because correcting corpora requires a lot of efforts and time, it has been difficult to construct a language understanding device for a new domain. In addition, because the weights are fixed, the language understanding accuracy may significantly vary due to the status of utterances and difference in users. In particular, because the language understanding strongly depends on the ASR accuracy, a model construction in accordance with the ASR accuracy is necessary. In our method, weights are assigned using features such as the length of words and reliability of the ASR results, which are independent on the domain. Therefore, it is possible to easily construct a language understanding device without using a large amount of corpora. Furthermore, an experimental evaluation in which the most appropriate weights based on the ASR accuracy were assigned to utterances revealed that such a weighting method improved the language understanding accuracy when compared with the case in which the same weights were assigned to all of the utterances.

<2. Weighting for ASR Results and for Concepts>

We define a weight in two levels for a WFST. One is a weighting for ASR results, which is set to select paths that are reliable at a surface word level. The other is a weighting for concepts, which is used to select paths that are reliable on a concept level. A weighting for concepts reflects correctness at an abstract level that is higher than the surface word one. The weighting for ASR results consists of two categories: a weighting for accepted words and one for fillers. We describe designs of these weightings hereafter.

<2.1 Weighting for Accepted Words>

We assign weights for word sequences, other than fillers, that have been accepted by the WFST. Larger weights are given to more reliable sequences of ASR results at the surface word level. Generally, longer sequences having more words which are not fillers and more reliable ASR results are preferred. We design this preference as the following weights $w_w$.

(1) word (constant): $w_w=1.0$
(2) word (#phoneme): $w_w=1(W)$
(3) word (CM): $w_w=CM(W)$ The word (constant) gives a constant weight to every accepted word. This represents that sequences with more words are simply preferred. The word (#phoneme) takes the length of each accepted word into consideration. The length is measured by its number of phonemes, which are normalized by the number of those of the longest word in the vocabulary. The normalized values are denoted as $1(W)$ $(0<1(W)\leq 1)$. By adopting word (#phoneme), the length of sequences is represented more minutely. We also take reliability of the accepted words into consideration as word (CM). This uses confidence measure for a word W in ASR results, which are denoted as $CM(W)$. This reflects the reliability of the ASR result for W, and then represents a preference for longer and more reliable sequences.

Here, the confidence measure $CM(W)$ for a word W is calculated from the relationship between the likelihood of the word W when the word W is included in the ASR result candidates during an ASR process and the likelihood of the other words which are the opposing candidates. The confidence measure $CM(W)$ is greater as the likelihood of the subject candidate (the word W) is relatively higher than that of the opposing candidates. The confidence measure $CM(W)$ for a word W is also disclosed in non-patent document 5 (Akinobu Lee, Kiyohiro Shikano, and Tatsuya Kawahara, "Real-time word confidence scoring using local posterior probabilities on tree trellis search.", In Proc. ICASSP, Vol. 1, pp. 793-796, 2004).

<2.2 Weighting for FILLERs>

We also assign weights for fillers. Since all words can be regarded as fillers, we give negative weights for fillers as penalties. Less and shorter fillers are preferred generally when inputted ASR results are reliable and contain many valid concepts. We prepare two kinds of weights $w_f$ as follows, which are similar to those for accepted words.

(1) FILLER (constant): $w_f=-1.0$
(2) FILLER (#phoneme): $w_f=-1(W)$

The FILLER (constant) represents a penalty to the number of fillers. The FILLER (#phoneme) designs this number more minutely by considering the length of each filler.

<2.3 Weighting for Concepts>

We also design a weight in a concept level in addition to the surface word level. The concepts are obtained from the parsing results by the WFST, and contain several words. Weights for the concept are designed by using measures of each word contained in the concept.

We prepare the following five kinds of weights for concepts.

$$cpt(\text{constant}): w_c = 1.0 \quad (1)$$

$$cpt(avg): w_c = \frac{\sum_W CM(W)}{\#W} \quad (2)$$

$$cpt(\min): w_c = \min_W(CM(W)) \quad (3)$$

$$cpt(lenCM(avg)): w_c = \frac{\sum_W (CM(W) \cdot l(W))}{\#W} \quad (4)$$

$$cpt(lenCM(\min)): w_c = \min_W(CM(W) \cdot l(W)) \quad (5)$$

We denote W (boldfaced) as a set of accepted words W in the corresponding concept, and #W (boldfaced) as the number of words included in W (boldfaced).

The cpt (constant) represents a preference for sequences with more concepts from one utterance. The cpt (avg) and cpt (min) are designed to neglect the words contained in the concept whose confidence measure is low. The cpt (lenCM (avg)) and cpt (lenCM(min)) represent a preference for the longer and reliable sequences with more concepts. These are defined to prefer utterances whose concepts are longer and more reliable. The average is calculated in the case of the cpt (avg) and cpt (lenCM(avg)) in order to reflect all of the words included in the concepts. Moreover, the minimum value is selected in the case of the cpt (min) and cpt (lenCM(min)) in order to prevent source errors due to the words whose confidence measures are extremely high.

<2.4 Calculating Cumulative Weight>

The language understanding results are selected based on a cumulative weight w which is the weighted sum of the above-mentioned three weights $w_w$, $w_f$, $w_c$, and defined by the following equation.

$$w = \Sigma \alpha_w w_w + \Sigma \alpha_f w_f + \Sigma \alpha_c w_c$$

The language understanding device selects the output sequence of the highest cumulative weight w.

An example of calculation for the cumulative weight w will be explained with reference to TABLE 3. In this example, the word (CM), FILLER (constant), and cpt (lenCM(avg)) were selected as parameters. When the input sequence is "No, it is February twenty second.", the sum of weights for accepted words is 4.1 $\alpha_w$, and that for FILLERs is $-1.0$ $\alpha_f$. The sum of weights for concepts is 1.335 $\alpha_c$ because the weight for "month=2" is $\alpha_c(0.9 \cdot 0.9)/1=0.81$ $\alpha_c$ and the weight for "day=22" is $\alpha_c(1.0 \cdot 0.6+0.9 \cdot 0.5)/2=0.525$ $\alpha_c$. Therefore, the cumulative weight w for this input sequence is 4.1 $\alpha_w-1.0$ $\alpha_f+1.335$ $\alpha_c$.

TABLE 3

| Input (ASR result) | No. | it | is | February | twenty | second |
|---|---|---|---|---|---|---|
| LU Output | F | it | is | February | twenty | second |
| CM (W) | 0.3 | 0.7 | 0.6 | 0.9 | 1.0 | 0.9 |
| l (W) | 0.3 | 0.2 | 0.2 | 0.9 | 0.6 | 0.5 |
| concept | — | — | — | Month = 2 | day = 22 | |
| word | — | $\alpha_w \cdot 0.7$ | $\alpha_w \cdot 0.6$ | $\alpha_w \cdot 0.9$ | $\alpha_w \cdot 1.0$ | $\alpha_w \cdot 0.9$ |
| FILLER | $\alpha_f \cdot (-1.0)$ | — | — | — | — | — |
| cpt | — | — | — | $\alpha_c (0.9 \cdot 0.9)/1$ | $\alpha_c (1.0 \cdot 0.6 + 0.9 \cdot 0.5)/2$ | |

<3. Experiments and Evaluation>
<3.1 Experimental Conditions>

We experimentally investigated the effect of the weightings defined in the above section "2. Weighting for ASR Results and for Concepts". In our experiment, the user's utterance was first recognized by ASR. Then, the ASR result was input to the WFST, and we determined the output sequence of the highest cumulative weight was a language understanding result. We calculated the language understanding accuracy by comparing the result to the reference (i.e., correct word sequence). It should be noted that because "no language understanding result is obtained" could be a correct result, the language understanding accuracy could be 100% even though the ASR accuracy is 0%. We compared language understanding accuracies for various combinations of weightings and coefficients $\alpha_w$, $\alpha_f$, and $\alpha_c$. The coefficient $\alpha_w$ was fixed to 1.0 and seven values of coefficients such as 0, 0.5, 1.0, 2.0, 3.0, 4.0, and 5.0 were tested for $\alpha_f$ and $\alpha_c$. If $\alpha_f=0$, or $\alpha_c=0$, the corresponding weight was not added.

We used 4186 utterances in the video recording reservation domain (TABLE 4) and 3281 utterances in the rent-a-car reservation domain (TABLE 5). The video recording reservation domain consisted of eight different dialogues with a total of 25 different speakers, and the rent-a-car reservation domain consisted of eight different dialogues with a total of 23 different speakers. We used Julius (refer to http://julius.sourceforge.jp/) as a speech recognizer with statistical language models. The statistical language models were respectively made from the 10,000 dialogues produced based on the recognition grammar of the domains. The vocabulary size of the language model of the video recording reservation domain was 209, and the vocabulary size of the language model of the rent-a-car reservation domain was 226. The average ASR accuracy was 80.3% in the case of the video recording reservation domain, and the average ASR accuracy was 52.8% in the case of the rent-a-car reservation domain (because the ASR accuracy was calculated while including insertion errors in this experiment, the ASR accuracy could be a negative value). The reference data (i.e., correct word sequence) of a language understanding was made by inputting the transcription into the WFST.

<3.2 Finding Parameter Setting Optimal for All Utterances>

In this experiment, we use the language understanding result of an input that simply exhibits the longest phrase matching with the grammar as a baseline. The baseline corresponds to the case in which the weight $w_w$ is word (constant), the coefficient $\alpha_f$ is set to zero (a weight for a FILLER is not added), and $\alpha_c$ is set to zero (a weight for a concept is not added).

The combination of the weights and coefficients which are optimal for all utterances was found. The highest average language understanding accuracy of 87.3% was obtained when by the combination of $w_w$=word (constant), $\alpha_f$=1.0, $w_f$=FILLER (#phoneme), $\alpha_c$=5.0, and $w_c$=cpt (lenCM(avg)) in the case of the video recording reservation domain, and the highest average language understanding accuracy of 65.0% was obtained when by the combination of $w_w$=word (CM), $\alpha_f$=0.5, $w_f$=FILLER (#phoneme), and $\alpha_c$=0 in the case of the rent-a-car reservation domain. In the case of the video recording reservation domain, the average language understanding accuracy of the baseline was 81.5% which was not remarkably different from the highest average language understanding accuracy. This was supposed due to a high average ASR accuracy of 80.3%. Accordingly, it is reasonable to simply select the longest matching path if the speech recognition is almost perfect. On the other hand, in the case of the rent-a-car reservation domain, the average ASR accuracy was 52.8%, which was relatively low, and the highest average language understanding accuracy was 65.0%, which was remarkably different from that at the baseline of 45.5%. In other words, when the ASR accuracy is relatively low, the combination exhibiting the highest performance is different from the combination of the baseline.

<3.3 Finding Optimal Parameter Setting for Each ASR Accuracy>

From the results described in the above section 3.2, the best combination of the weights (parameters) can be obtained by determining the combination depending on the ASR accuracy of utterances. Accordingly, we investigated the best combination of the parameters for each ASR accuracy by classifying the utterance data by the ASR accuracies thereof and by calculating the language understanding accuracy for each ASR accuracy class. Then, we compared the language understanding accuracy with that of the baseline for each ASR accuracy class. The results are shown in TABLES 4 and 5. The class 10-30 in the TABLES means that the ASR accuracy was more than 10% and less than 30%. Only the class 90-100 contains a case where ASR accuracy was 100%.

TABLE 4

| ASR Acc | #utt. | $w_w$ | $\alpha_f$ | $w_f$ | $\alpha_c$ | $w_c$ | LU Acc | LU Acc (baseline) |
|---|---|---|---|---|---|---|---|---|
| −∞-100 | 4186 | word (constant) | 1.0 | FILLER (#phoneme) | 5.0 | cpt (lenCM(avg)) | 87.3 | 81.5 |
| −∞-10 | 343 | word (CM) | 0.5 | FILLER (#phoneme) | 5.0 | cpt (lenCM(avg)) | 60.8 | 59.2 |

TABLE 4-continued

| ASR Acc | #utt. | $w_w$ | $\alpha_f$ | $w_f$ | $\alpha_c$ | $w_c$ | LU Acc | LU Acc (baseline) |
|---|---|---|---|---|---|---|---|---|
| 10-30 | 63 | word (#phoneme) | 0.5 | FILLER (constant) | 1.0-5.0 | cpt (lenCM(avg)) | 23.9 | 8.2 |
| 30-50 | 113 | word (constant) | 1.0 | FILLER (#phoneme) | 5.0 | cpt (lenCM(min)) | 55.4 | 43.1 |
| 50-70 | 389 | word (#phoneme) | 0.5 | FILLER (#phoneme) | 0.5-1.0 | cpt (lenCM(avg)) | 64.5 | 48.4 |
| 70-90 | 283 | word (constant) | 0.5 | FILLER (#phoneme) | 4.0-5.0 | cpt (lenCM(avg)) | 73.3 | 58.7 |
| 90-100 | 2995 | word (constant) | 0.5-5.0 | FILLER (constant) | 0.5-5.0 | cpt (constant) | 98.4 | 94.6 |
| | | Average of LU Accuracies for ASR Acc classes | | | | | 88.2 | 81.5 |

TABLE 5

| ASR Acc | #utt. | $w_w$ | $\alpha_f$ | $w_f$ | $\alpha_c$ | $w_c$ | LU Acc | LU Acc (baseline) |
|---|---|---|---|---|---|---|---|---|
| $-\infty$-100 | 3281 | word (CM) | 0.5 | FILLER (#phoneme) | 5.0 | n/a | 65.0 | 45.5 |
| $-\infty$-10 | 718 | word (CM) | 0.5 | FILLER (#phoneme) | 5.0 | n/a | 15.0 | 11.7 |
| 10-30 | 142 | word (CM) | 0.5 | FILLER (#phoneme) | 1.0-5.0 | cpt (min) | 35.1 | 9.3 |
| 30-50 | 148 | word (CM) | 0.5-5.0 | FILLER (#phoneme) | 5.0 | cpt (lenCM(avg)) | 48.1 | 22.4 |
| 50-70 | 369 | word (#phoneme) | 0.5 | FILLER (#phoneme) | 0.5-1.0 | cpt (avg) | 55.0 | 26.3 |
| 70-90 | 202 | word (constant) | 0.5 | FILLER (#phoneme) | 4.0-5.0 | cpt (lenCM(avg)) | 63.4 | 14.2 |
| 90-100 | 1702 | word (constant) | 0.5-5.0 | FILLER (constant) | 0.5-5.0 | cpt (avg) | 91.5 | 75.2 |
| | | Average of LU Accuracies for ASR Acc classes | | | | | 64.5 | 45.5 |

These results showed that language understanding accuracy was improved from the baseline in almost all classes separated by ASR accuracy. In particular, in the case of the rent-a-car reservation domain, the language understanding accuracies were remarkably improved when compared with the baselines.

This result showed, in both of the domains, that the weights word (constant) and word (#phoneme) for the accepted words were effective in the utterances with high ASR accuracy, and the weight word (CM) for the accepted words was effective in the utterances with low ASR accuracy. In particular, this tendency is apparent in the case of the rent-a-car reservation domain. This was because, if the utterance is correctly recognized, the best approach is to select a candidate containing the most words, and if the ASR accuracy is low, only reliable words should be selected.

The penalties for the fillers are required in both domains and in any classes. This was because it was necessary to prevent source errors due to the fillers. Moreover, in both of the domains and in most of the classes, the weight FILLER (#phoneme) produced the best performance. Because the fillers apply no information to a language understanding, it is supposed that the number of phonemes (time of duration) is more appropriate for the reference of penalty rather than the number of words.

The weights for the concepts were required in both domains, and weights for the concepts were effective as well as the weights for the surface words. In the case of the class of $-\infty$ to 100 (all utterances) in the rent-a-car reservation domain, no weight assignment for the concepts exhibited the best performance; however, assignment of the cpt (lenCM (avg)) or cpt (lenCM(min)) exhibited almost same language understanding accuracy of 64.9%. In both of the domains, use of confidence measure of the words such as assignment of the cpt (avg) or cpt (lenCM(min)) exhibited the best performance in most of the classes. This is supposed that the confidence measures of the words effectively functioned as the weights for the concepts.

The result above showed that the language understanding accuracy was improved when the combination of weightings was set properly according to the ASR accuracy. The ASR accuracy in spoken dialogue systems can be calculated without a large amount of corpora. Thus, our method is effective in developing a language understanding device for a new domain whose corpus is not available. Moreover, this experimental result indicates a possibility of improvement in the language understanding accuracy, even when the ASR accuracy could not be calculated in advance, by changing the combination of the weights depending on users or situation. For example, if the user is not familiar with spoken dialogue systems, the parameters suitable for a low ASR accuracy should be selected, and if the environment is quiet with little noises, the parameters suitable for a high ASR accuracy should be selected in order to further improve the language understanding accuracy.

Next, an example operation of the present method is shown in TABLE 6. In this example, the user's utterance was "June 3 please", which was erroneously recognized as "June 3 uhm FIT® please". In the case of the baseline method, the phrase "FIT® please" was accepted so that the number of accepted words was simply maximized, and "June" and "(day) 3" were erroneously neglected. In contrast, in our method, a correct language understanding result could be obtained by taking into account the confidence measure or the length of fillers of "June" and "(day) 3".

TABLE 6

| Transcription | June | (day) 3 | | | please | Language understanding result |
|---|---|---|---|---|---|---|
| ASR result | June | (day) 3 | uhm | FIT ® | please | |
| CM (W) | 0.978 | 0.757 | 0.152 | 0.525 | 0.741 | |
| Correct result | June | (day) 3 | F | F | F | type: refer-time, month: 6, day: 3 |
| Optimal result | June | (day) 3 | F | F | F | type: refer-time, month: 6, day: 3 |
| Baseline | F | F | F | FIT ® | please | type: specify-class, car: FIT ® |

Here, the operations of the units included in the language understanding device 1 will be explained with reference to FIG. 1 again.

ASR results are input to the language understanding device 1. The ASR results consist of word sequences. Alternatively, the ASR results may include ASR accuracy data during an ASR process in the previous step, or confidence measure data for each of the words.

The language understanding model storing unit 10 stores, as a language understanding model, word transition data and concept weighting data. In addition, the language understanding model may further include filler transition data. The word transition data are data defining the state transition by the input words, and include plural combinations of pre-transition states, input words, predefined outputs corresponding to the input words, word weight information, and post-transition states. The filler transition data are data defining the state transition by arbitrary input words (including a null word), and include plural combinations of pre-transition states, fillers matching an arbitrary word, filler weight information, and post-transition states. The concept weighting data are data defining the weights for concepts, and include plural combinations of concepts and concept weight information corresponding to the concepts.

The word weight information, the filler weight information, and the concept weight information respectively include information of which type (or function) of weight should be used, and parameters $\alpha_w$, $\alpha_f$, and $\alpha_c$ which are used during calculation of the cumulative weight w which is a weighted summation of the weights (i.e., $w_w$, $w_f$, and $w_c$). Alternatively, the language understanding model may include the optimum word weight information, the optimum filler weight information, and the optimum concept weight information for each of the language understanding accuracy classes.

The finite state transducer processing unit 20 outputs understanding result candidates including the predefined outputs based on words included in a word sequence being input and present states, and in accordance with the word transition data read out from the language understanding model storing unit 10, accumulates word weights, and sequentially performs state transition operations by which transitions to the post-transition states are carried out. Moreover, when fillers are used, fillers are matched with arbitrary words (including a null word), the finite state transducer processing unit 20 accumulates filler weights in accordance with the filler transition data, and performs the state transition operations by which transition to the post-transition states are carried out. It should by noted that transitions by the filler and transitions by the input words other than filler may be combined when obtaining an output sequence (an understanding result candidate). The present states during the transitions are temporarily stored by appropriately renewing the internal memory of the finite state transducer processing unit 20.

As a result of the above processing, the finite state transducer processing unit 20 sends the above-defined output sequences as understanding result candidates to the concept weighting processing unit 30. Plural understanding result candidates are output for one input sequence. In addition, a cumulative word weight ($\Sigma \alpha_w w_w$) is assigned to each of the understanding result candidates. When fillers are used, a cumulative filler weight ($\Sigma \alpha_f w_f$) is also assigned to each of the understanding result candidates.

The concept weighting processing unit 30 accumulates concept weights, which correspond to the concepts included in the understanding result candidates output from the finite state transducer processing unit, in accordance with the concept weighting data read out from the language understanding model storing unit 10. As a result, the concept weighting processing unit 30 assigns a cumulative word weight ($\Sigma \alpha_c w_c$), in addition to the output results from the finite state transducer processing unit 20, to each of the understanding result candidates.

A concept is defined as a combination of a predefined slot and a value corresponding to the slot. A language understanding result (including candidates) is a set of concepts. For example, a language understanding result (candidate) of [month=2, day=22] consists of a concept in which a value "2" is set in a slot of "month" and a concept in which a value "22" is set in a slot of "day". A language understanding result (candidate) is a sequence output by the finite state transducer processing unit 20 in accordance with the predefined language understanding model. More specifically, the correspondence between a concept and a set of words can be obtained with reference to the language understanding model, i.e., the concept weighting processing unit 30 can calculate the concept weight corresponding to an understanding result candidate by referring to the language understanding model.

The understanding result determination unit 40 determines and outputs an understanding result from the output understanding result candidates (plural sequences) based on the cumulative word weight and the cumulative concept weight. When fillers are used, the understanding result determination unit 40 determines and outputs an understanding result based on the cumulative filler weight, the cumulative word weight, and the cumulative concept weight.

If the language understanding process in the above sequential processes is carried based on the ASR accuracy, the finite state transducer processing unit 20 and the concept weighting processing unit 30 read out the data corresponding to the ASR accuracy from the language understanding model storing unit 10 based on the information regarding the ASR accuracy.

Next, the operations of the units included in the speech response system 100 will be explained with reference to FIG. 2.

The speech detection unit 2 finds segments of voice of a user based on an external speech signal input through a microphone, and outputs speech waveform data in respective speech segments.

The acoustic model storing unit 3 stores in advance the data of acoustic features for every phoneme as acoustic models. For example, the MFCC (Mel-Frequency Cepstrum Coefficient) or the like is used as the acoustic features. The domain-dependent language model storing unit 4 stores in advance the data including word occurrence frequencies in the subject domain and inter-words connection probabilities (conditional probabilities) in the subject domain as domain-dependent language models. The speech recognition unit 5 carries out a speech recognition processing for the speech waveform data receiving from the speech detection unit 2 using the acoustic models read out from the acoustic model storing unit 3 and the language models read out from the domain-dependent language model storing unit 4, and outputs a maximum likelihood word sequence obtained as a result of the speech recognition processing as the speech recognition result.

The language understanding device 1 carries out the above language understanding processing based on the word sequence output from the speech recognition unit 5, and outputs the understanding result obtained as a result of the processing. The response production unit 6 carries out a processing peculiar to the subject domain based on the understanding result (e.g., a rent-a-car reservation, a video recording reservation, etc.), and outputs a response to a user as a result of the processing. The response may be output in the form of character string data or in the form of synthesized voice as a result of a voice synthesizing processing.

We developed the WFST-based language understanding device for spoken language understanding. We defined two kinds of weightings for the WFST, which correspond to language understanding likelihoods at the word and concept levels. These two kinds of weightings are calculated based on the number of phonemes and confidence measures of an ASR result. This makes it possible to create a language understanding device for a new domain with less labor because the weighting scheme is relatively simpler.

In the experiment, the optimal parameters were selected according to the ASR accuracy for the utterances in two different domains. It was confirmed that the language understanding accuracy can be improved compared to the baseline by selecting optimal parameters according to the ASR accuracy. In addition, the relationship between the ASR accuracy and the optimal weightings was discussed based on the differences in the ASR accuracy and the optimal weightings in two domains. This result indicates that it will be possible to adaptively improve the language understanding accuracy by appropriately assigning the weights in accordance with the states of utterances such as the ASR accuracy or users.

Second Embodiment

Next, a second embodiment of the present invention will be explained. In the second embodiment, N-best candidates of speech recognition results are used. By using N-best candidates, it is possible to further improve the language understanding accuracy if the correct recognition result is included in the N-best candidates by using such a result even if the correct recognition result is not included in the first candidate of the recognition results (an example is shown in TABLE 7 below).

TABLE 7

| rank | No, | it | is | February | twenty | second |
|---|---|---|---|---|---|---|
| 1 | No, | it | is | January | twenty | second |
| 2 | No, | it | is | February | twenty | second |
| ... | | | | ... | | |
| ... | | | | ... | | |

Figure 5:
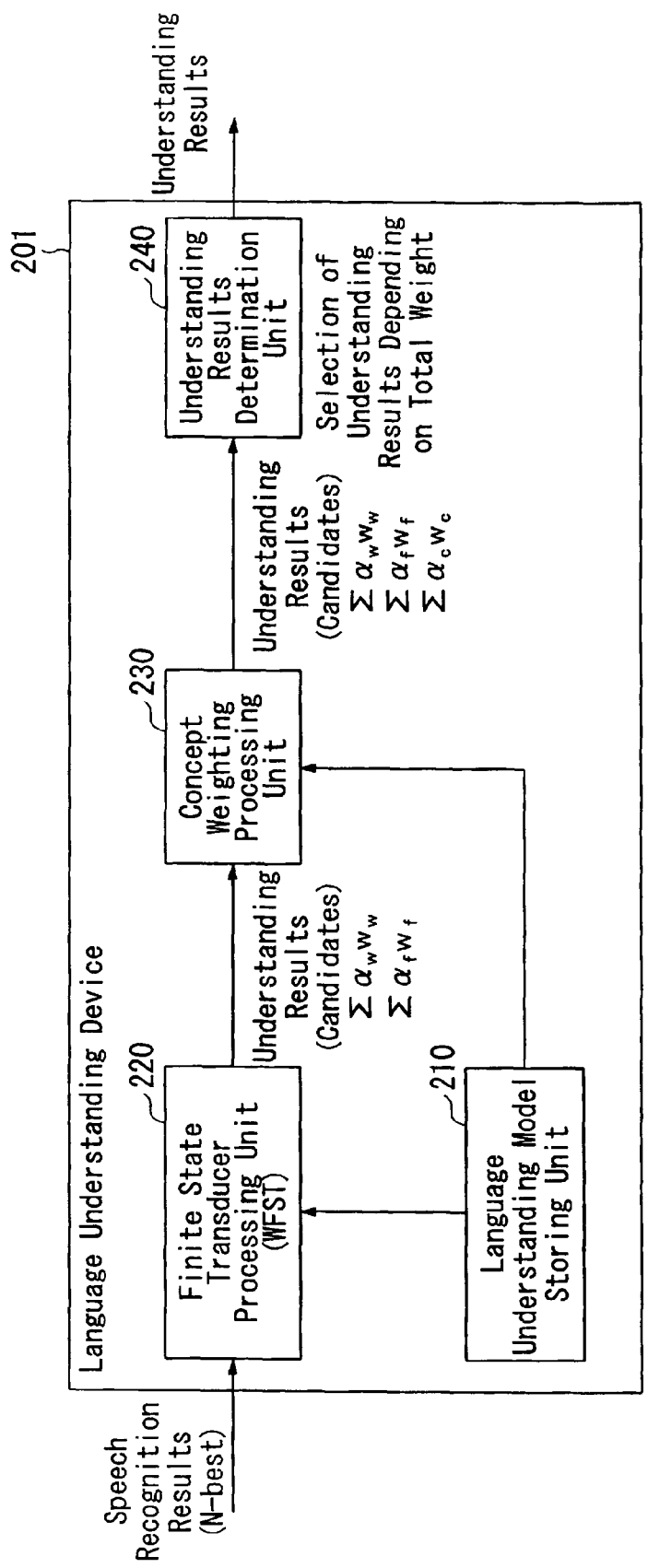
FIG. 5 is a block diagram showing the functional constitution of a language understanding device according to a second embodiment of the present invention.

FIG. 5 is a block diagram showing the functional constitution of a language understanding device 201 according to the second embodiment. As shown in FIG. 5, the language understanding device 201 includes a language understanding model storing unit 210, a finite state transducer processing unit 220, a concept weighting processing unit 230, and an understanding result determination unit 240. The language understanding device 201 mainly differs from the language understanding device 1 in the first embodiment in that the speech recognition results to be input are N-best candidates. In the following description, the features which are common to the first embodiment will be omitted, and the features peculiar to the second embodiment will be mainly described.

The language understanding device 201 according to the second embodiment receives as an input the N-best outputs of the speech recognition results from the speech recognition unit 5. The N-best outputs are defined as the best N word-sequences in terms of reliability among the candidates of the speech recognition results.

The finite state transducer processing unit 220 and the concept weighting processing unit 230 of the second embodiment calculate a weighted summation w of three types of weights $w_w$, $w_f$, and $w_c$ for all of the output sequences of N-best candidate phrases. Then, the understanding result determination unit 240 obtains a language understanding result by selecting the output sequence (language understanding result candidate) which has the greatest weighted summation w among the output sequences.

It should be noted that at least a portion of the language understanding device or the speech response system in the above embodiments may be implemented by a computer. In such a case, these functions may be achieved by recording a program for implementing these functions in a computer-readable medium, by loading the program recorded in the recording medium into a computer system, and by executing the program. Here, "computer system" includes an OS and hardware such as peripheral devices. The "computer-readable recording medium" is a storage device such as a portable medium including a flexible disc, an optical-magnetic disc, a ROM, a CD-ROM, etc. and a hard disc or the like built in the computer system. Furthermore, the "computer-readable recording medium" includes a device dynamically storing a program for a short period such as a communication line used for transmitting a program via a network such as the Internet or communication lines such as a telephone line, or a device storing a program for a predetermined period such as a volatile memory device inside the computer system that becomes a server or a client in a case in which a program is transmitted. Furthermore, the program may implement a portion of the above-described functions. The program may be a differential program that can be combined with a program recorded in a computer system in advance so as to implement the above-described functions.

While preferred embodiments of the invention have been described and illustrated above, it should be understood that these are exemplary of the invention and are not to be considered as limiting. Additions, omissions, substitutions, and other modifications can be made without departing from the scope of the present invention.

For example, the finite state transducer processing unit and the concept weighting processing unit may be combined in one unit. In other words, instead of carrying out the processing by the concept weighting processing unit after the entire processing by the finite state transducer processing unit is completed, each of the concepts may be determined based on the immediately preceding sequence having "j" words ("j" is an integer) among the input word sequences, and concept weights corresponding to the concepts may be sequentially accumulated while the state transition operations are being executed by the finite state transducer processing unit. Although the processing by the finite state transducer processing unit and the processing by the concept weighting processing unit are partially simultaneously executed, the concept weighting processing unit accumulates the concept weights, which correspond to the concepts included in the understanding result candidates output from the finite state transducer processing unit, in accordance with the concept weighting data read out from the language understanding model storing unit, as in the case of the above embodiments.

Moreover, in the above embodiments, the finite state transducer processing unit and the concept weighting processing unit calculate the cumulative weight using the word weight information, and the filler weight information, and the concept weight information, which are selected depending on the ASR accuracy; however, instead of this configuration, the finite state transducer processing unit and the concept weighting processing unit may calculate all types of the weights possibly required, and the understanding result determination unit 40 may calculate an overall final weight depending on the ASR accuracy.

Furthermore, when N-best candidates of the speech recognition results are used, the understanding result determination unit may determine the understanding result among the understanding result candidates by also taking into account the confidence measures of the N-best candidates during the speech recognition processing.

The present invention is applicable to speech recognition by a machine. More specifically, the present invention is applicable to a voice-based human-machine interface such as a human interface in a business system, communication between human and a robot, or communication between human and vehicles (e.g., automobiles).

What is claimed is:

1. A language understanding device comprising:
a language understanding model storing unit configured to store, as a language understanding model, word transition data, filler transition data and concept weighting data,
said word transition data including pre-transition states, input words, predefined outputs corresponding to the input words, word weight information, and post-transition states,
filler transition data including pre-transition states, fillers matching an arbitrary word, filler weight information, and post-transition states, and
said concept weighting data including concepts obtained from language understanding results for at least one word, and concept weight information corresponding to the concepts;
a finite state transducer processing unit configured to output understanding result candidates based on words included in a word sequence being input which is obtained by a speech recognition process and present states,
said understanding result candidates including the predefined outputs, and
in accordance with the word transition data read out from the language understanding model storing unit, to accumulate word weights so as to obtain a cumulative word weight as a numeric value for each of the understanding result candidates, and
to sequentially perform state transition operations by which transitions to the post-transition states are carried out;
the finite state transducer processing unit is further configured to accumulate filler weights in accordance with the filler transition data read out from the language understanding model storing unit
so as to obtain a cumulative filler weight as a numeric value for each of the understanding result candidates, and
to perform the state transition operations by which transition to the post-transition states are carried out;
a concept weighting processing unit configured to accumulate concept weights,
which correspond to the concepts included in the understanding result candidates output from the finite state transducer processing unit,
in accordance with the concept weighting data read out from the language understanding model storing unit so as to obtain a cumulative concept weight as a numeric value for each of the understanding result candidates; and
an understanding result determination unit configured to determine an understanding result from the understanding result candidates based on the cumulative word weight, the cumulative filler weight and the cumulative concept weight for each understanding result candidate,
wherein the understanding result determination unit is configured to determine the understanding result as the understanding result candidate having a highest value for a summed cumulative word weight, cumulative filler weight and cumulative concept weight.

2. The language understanding device according to claim 1,
the language understanding model storing unit is further configured to store the word weight information and the concept weight information which are determined depending on speech recognition accuracy during the speech recognition process, and
the understanding result determination unit is further configured to determine the understanding result based on the cumulative word weight obtained based on the word weight information which depends on the speech recognition accuracy and the cumulative concept weight obtained based on the concept weight information which depends on the speech recognition accuracy for each understanding result candidate.

3. The language understanding device according to claim 1, wherein
the word sequence being input includes N word-sequences, where N is a natural number equal to or greater than 2,
the finite state transducer processing unit is further configured to output the understanding result candidates for each of the N word-sequences by performing the state transition operations for each of the N word-sequences, and
the understanding result determination unit is further configured to determine the understanding result from all of the understanding result candidates corresponding to the N word-sequences.

4. A language understanding device comprising:
a language understanding model storing unit configured to store, as a language understanding model, word transition data, filler transition data and concept weighting data,
said word transition data including pre-transition states, input words, predefined outputs corresponding to the input words, word weight information, and post-transition states,
filler transition data including pre-transition states, fillers matching an arbitrary word, filler weight information, and post-transition states, and
said concept weighting data including concepts obtained from language understanding results for at least one word, and concept weight information corresponding to the concepts;
a finite state transducer processing unit configured to output understanding result candidates based on words included in a word sequence being input and present states, said understanding result candidates including the predefined outputs, and in accordance with the word transition data read out from the language understanding model storing unit, to accumulate word weights so as to obtain a cumulative word weight as a numeric value for each of the understanding result candidates, and to sequentially perform state transition operations by which transitions to the post-transition states are carried out, wherein the word weights are accumulated from the word weight information stored in the language understanding model storing unit, and the word weight information is determined based on a number of phonemes and an automatic speech recognition confidence;

the finite state transducer processing unit is further configured to accumulate filler weights in accordance with the filler transition data read out from the language understanding model storing unit
  so as to obtain a cumulative filler weight as a numeric value for each of the understanding result candidates, and
  to perform the state transition operations by which transition to the post-transition states are carried out;
a concept weighting processing unit configured to accumulate concept weights, which correspond to the concepts included in the understanding result candidates output from the finite state transducer processing unit, in accordance with the concept weighting data read out from the language understanding model storing unit so as to obtain a cumulative concept weight as a numeric value for each of the understanding result candidates; and
an understanding result determination unit configured to determine an understanding result from the understanding result candidates based on the cumulative word weight, the cumulative filler weight and the cumulative concept weight for each understanding result candidate,
wherein the understanding result determination unit is configured to determine the understanding result as the understanding result candidate having a highest value for a summed cumulative word weight, cumulative filler weight and cumulative concept weight.

* * * * *